(No Model.) 2 Sheets—Sheet 1.
J. J. HADEN & W. S. GOBBLE.
STEAM COOKING APPARATUS.
No. 325,335. Patented Sept. 1, 1885.
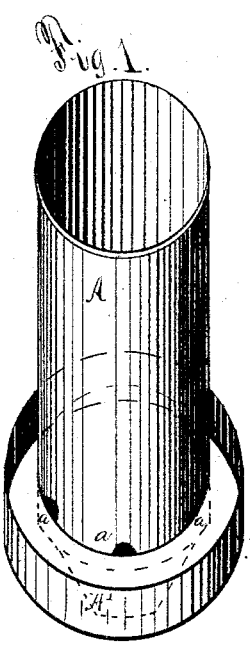
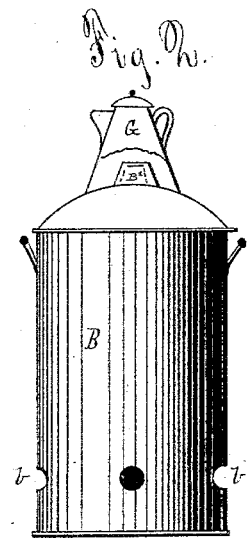
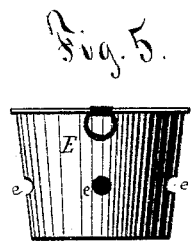
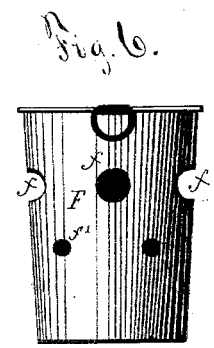

(No Model.) 2 Sheets—Sheet 2.
J. J. HADEN & W. S. GOBBLE.
STEAM COOKING APPARATUS.
No. 325,335. Patented Sept. 1, 1885.
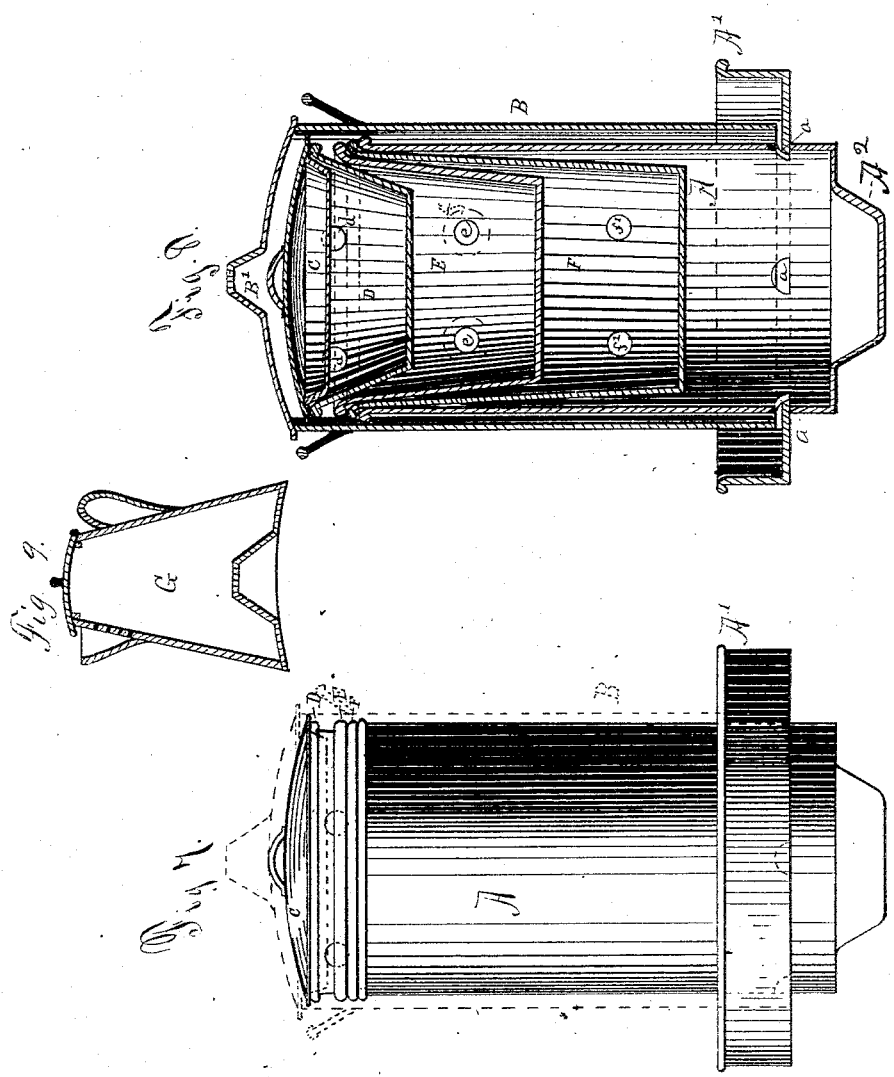
Witnesses.
J. Charleton Ingram.
L. Bingham
Inventor.
John J. Haden
William S. Gobble
By their atty John S. Duffie

UNITED STATES PATENT OFFICE.

JOHN J. HADEN AND WILLIAM S. GOBBLE, OF TEXARKANA, ARKANSAS.

STEAM COOKING APPARATUS.

SPECIFICATION forming part of Letters Patent No. 325,335, dated September 1, 1885.

Application filed February 20, 1885. (No model.)

*To all whom it may concern:*

Be it known that we, JOHN J. HADEN and WILLIAM S. GOBBLE, citizens of the United States, residing at Texarkana, in the county of Miller and State of Arkansas, have invented certain new and useful Improvements in Steam Cooking Apparatus; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention has relation to domestic steam cooking apparatus, and is particularly adapted to cooking several kinds of food at the same time by the proper disposition and utilization of steam.

In the accompanying drawings, Figure 1 is a perspective view of the steam-cylinder and water-pan. Fig. 2 is an elevation of the perforated cylindrical cover, with coffee-pot. Fig. 3 is an elevation of the inside cover. Figs. 4, 5, and 6 are elevations of the several inside cooking-vessels. Fig. 7 is an elevation of the steam-cooker, showing the arrangement of the inside vessels as they rest on the rim of the steam-cylinder. Fig. 8 is a sectional view of the steam-cooker, taken on a line cut through the center. Fig. 9 is a sectional view of the coffee-pot.

Our invention consists of several cooking-vessels fitting into each other, each with its top rim resting on the top rim of the vessel into which it fits. Each of the vessels being of the same diameter across the top, they can be used separately or together, as may be required.

A is a steam-cylinder, with a water-pan, A', attached and running all around its circumference a short distance above the bottom of the said cylinder. The bottom of cylinder A may be made flat, so as to sit directly on the top of the stove, and thereby fit any stove; or it may have an extended bottom, A², so as to sit down into any one of the stove-holes. This steam-cylinder A has a line of perforations, *a*, around its circumference at the junction of the said cylinder and the water-pan A', to allow the water to flow into the said cylinder, thus giving more heating-surface, and consequently a greater amount of steam is generated.

B is the outside cylindrical cover, which sits down over all, and its bottom rim resting on the bottom of the said water-pan. Just above the bottom rim of the said cover is a line of perforations, *b*. These perforations are so placed that when the said water-pan is full of water the perforations will be submerged, and thus render the said steam-cooker steam-tight; but if at any time during the operation of cooking too large a quantity of steam is generated, the pressure on the inside of the top of the cover B will raise the said cover until the perforations *b* are above the water, and the steam will escape, and thus allow the said cover to rest once more on the bottom of the said water-pan and again become steam-tight. This arrangement also obviates the danger of an explosion.

C is simply an ordinary cover fitting on either of the vessels D, E, or F, as they are all the same size at the top.

D is the shallowest of the cooking-vessels, and has a row of perforations, *d*, around its circumference, to allow the steam to enter the same. These perforations are so placed that when the said pan is in position they will be partially above the rim of the vessel into which it fits, as shown in Figs. 7 and 8.

E is the medium-sized vessel, and fits into the next larger vessel, F. This vessel also has a row of perforations, *e*, around its circumference, corresponding in position to the upper row of perforations, *f*, in the vessel F, to allow of a free circulation of the steam between the said vessels E and F.

F is a deep cooking-vessel, which fits into and rests on the top rim of the steam-cylinder A. This vessel F has two rows of perforations, *f* and *f'*, around its circumference. The upper row, *f*, are made larger than the others, and are for use as above described. The lower ones, *f'*, allow the steam to enter into the bottom of the said vessel, and add to the effect by acting on the bottom of the smaller vessel, E.

The outside cylindrical cover, B, has on its top a steam-drum, B', to heat the coffee-pot G, which is set over the same.

The coffee-pot G has its bottom concave, to conform to the convex surface of the top of the cover B, and the center of the bottom is cupped, so as to fit over the said steam-drum. It is not made to fit tight over the same, but loosely, so that the radiated heat may play around the drum B', and so that the coffee-pot may be put on and taken off with ease.

We do not confine ourselves to the number of the inside vessels here given.

The holes $e$ of the vessel E are immediately under the bottom of the pan D when fitted into E, and the holes $f'$ are immediately under the bottom of the vessel E when fitted into F. Thus it will be seen that the steam entering these holes cooks the food in the bottom of the vessels, and also warms the vessel immediately above.

Having described our invention, what we claim as new, and desire to secure by Letters Patent, is—

1. The combination of the steam-cylinder A, having a water-pan, A', surrounding it, and having perforations $a$, with the vessels D, E, and F, resting on the rim of said cylinder, and cylindrical cover B, having perforations $b$ and steam-drum B', all substantially as shown and described.

2. The combination of the steam-cylinder A, having the water-pan A', with vessel D, having perforations $d$, vessel E, having perforations $e$ immediately below the bottom of vessel D, and corresponding in position with the upper perforations, $f$, in the larger vessel, F, vessel F, having two rows of perforations, $f$ and $f'$, the upper row, $f$, being larger and corresponding to the perforations $e$ in the vessel E, the lower row, $f'$, being immediately below the bottom of the vessel E, and cylindrical cover B, having steam-drum B' and perforations $b$, all substantially as shown and described.

In testimony whereof we affix our signatures in presence of two witnesses.

JOHN J. HADEN.
WILLIAM S. GOBBLE.

Witnesses:
J. D. INGRAM,
J. E. COOK.